(12) United States Patent
Zota et al.

(10) Patent No.: US 12,670,426 B2
(45) Date of Patent: Jun. 30, 2026

(54) SCALABLE QUBIT BIASING DEVICE BASED ON MULTIPLEXED CHARGE STORAGE

(71) Applicant: INTERNATIONAL BUSINESS MACHINES CORPORATION, Armonk, NY (US)

(72) Inventors: Bogdan Cezar Zota, Rueschlikon (CH); Eunjung Cha, Adliswill (CH); Thomas Morf, Gross (CH); Mridula Prathapan, Adliswil (CH); Peter Mueller, Zurich (CH); Alberto Ferraris, Langnau am Albis (CH)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 736 days.

(21) Appl. No.: 18/171,447

(22) Filed: Feb. 20, 2023

(65) Prior Publication Data

US 2024/0281691 A1      Aug. 22, 2024

(51) Int. Cl.
*G06N 10/40* (2022.01)

(52) U.S. Cl.
CPC .................................. *G06N 10/40* (2022.01)

(58) Field of Classification Search
USPC ................ 716/100, 101, 102, 106, 108, 109
See application file for complete search history.

(56) References Cited

U.S. PATENT DOCUMENTS

| | | | |
|---|---|---|---|
| 2019/0164959 A1 | 5/2019 | Thomas | |
| 2020/0395943 A1* | 12/2020 | Das | H03K 19/195 |
| 2023/0026029 A1* | 1/2023 | Deen | H03K 17/102 |

FOREIGN PATENT DOCUMENTS

| | | |
|---|---|---|
| CN | 120677638 A | 9/2025 |
| WO | 2024/175417 A1 | 8/2024 |

OTHER PUBLICATIONS

Lotte Geck "Scalable Control Electronics for a Spin Based Quantum Computer", Schriften des Forschungszentrums Jülich Reihe Information/ Information, Band/vol. 65 (Diss. RWTH Aachen University, 2020) (Year: 2020).*
Geck, L. et al. (2019). Control electronics for semiconductor spin qubits. Quantum Science and Technology, 5. DOI 10.1088/2058-9565/ab5e07.

(Continued)

*Primary Examiner* — Brian Ngo
(74) *Attorney, Agent, or Firm* — Jeffrey Kelly

(57) ABSTRACT

Embodiments including a semiconductor device circuit for biasing gates of a qubit device as well as a method for operating the device are disclosed. The embodiments may include a multiplexed array of capacitor cells, where each capacitor cell includes a transistor-controlled capacitor, where each capacitor is connected between a drain of a respective transistor and ground, where each source of all transistors of all capacitor cells are connected to a common control point, and where each gate of the transistors of the capacitor cells are individually voltage controllable. The embodiment may include a charging unit connected to the common control point, and a discharging unit connected to the common control point, where the charging unit and the discharging unit are alternatively activatable.

16 Claims, 10 Drawing Sheets

(56) References Cited

OTHER PUBLICATIONS

Notification of Transmittal of the International Search Report and the Written Opinion of the International Searching Authority, or Declaration for International Application No. PCT/EP2024/053572, mailed May 31, 2024, 18 pgs.

Pauka S J et al. (2019). A Cryogenic Interface for Controlling Many Qubits. https://www.researchgate.net/publication/337729811_A_Cryogenic_Interface_for_Controlling_Many_Qubits.

Barak, "Addressing large-scale qubit arrays for quantum computer", https://repository.tudelft.nl/islandora/object/uuid%3A324c519a-082a-455d-afff-fdbf0a32f040, Dec. 17, 2015, pp. 1-59.

Dijk, et al., "A Scalable Cryo-CMOS Controller for the Wideband Frequency-Multiplexed Control of Spin Qubits and Transmons", TU Delft, [Accessed on Feb. 20, 2023], 4 Pages. Retrieved from Internet: <https://research.tudelft.nl/en/publications/a-scalable-cryo-cmos-controller-for-the-wideband-frequency-multip>.

Enthoven et al., "A 3V 15b 157 µW Cryo-CMOS DAC for Multi-plexed Spin-Qubit Biasing", https://ieeexplore.ieee.org/document/9830309, 2022, pp. 1-3.

Mouny et al., "Memristor-based cryogenic programmable DC sources for scalable in-situ quantum-dot control", https://arxiv.org/pdf/2203.07107.pdf , Mar. 22, 2022, pp. 1-13.

Patra et al, "A Scalable Cryo-CMOS 2-to-20GHz Digitally Intensive Controller for 4×32 Frequency Multiplexed Spin Qubits/Transmons in 22nm FinFET Technology for Quantum Computers", https://ieeexplore.ieee.org/document/9063109, 2020, pp. 1-4.

Pauka et al., "A Cryogenic CMOS chip for generating control signals for multiple qubits", http://doi.org/10.1038/s41938-020-00s28-y,, Nature Electronics | vol. 4 | Jan. 2021, www.nature.com/natureelectronics, pp. 64-70.

Riste, et al., "Detecting bit-flip errors in a logical qubit using stabilizer measurements", arXiv:1411.5542v1 [quant-ph], Nov. 20, 2014, 12 Pages.

Schaal et al., "A CMOS dynamic random access architecture for radio-frequency readout of quantum devices", arXiv:1809.03894, Sep. 11, 2018, pp. 1-4.

Vandersypen et al., "Interfacing spin qubits in quantum dots and donors-hot, dense, and coherent", https://www.nature.com/articles/s41534-017-0038-y.pdf, Dec. 18, 2016, pp. 1-13.

Veldhorst et al., "Silicon CMOS architecture for a spin-based quantum computer", https://www.nature.com/articles/s41467-017-01905-6, Dec. 15, 2017, pp. 1-38.

Bardin, et al., "Design and Characterization of a 28-nm Bulk-CMOS Cryogenic Quantum Controller Dissipating Less Than 2 mW at 3 K", IEEE Journal of Solid-State Circuits, vol. 54, No. 11, Nov. 2019, 18 Pages.

* cited by examiner

| $R_{ON}/R_{OFF}$ | 1.00E+06 | | | $R_{ON}/R_{OFF}$ | 1.00E+04 | |
| RC charge (s) | 1.00E-08 | | | RC charge (s) | 1.00E-08 | |
| RC discharge (s) | 1.00E-02 | | | RC discharge (s) | 1.00E-04 | |
| Multiplexing factor | 10 | | | Multiplexing factor | 10 | |
| | | | | | | |
| Step | t (s) | $V_{out}$ (V) | | Step | t (s) | $V_{out}$ (V) |
| $t_{write}$ | 4.00E-08 | 1.00E+00 | | $t_{write}$ | 4.00E-08 | 1.00E+00 |
| $t_{rest}$ | 9.00E-08 | 1.000E+00 | | $t_{rest}$ | 9.00E-08 | 9.991E-01 |
| Voltage stability | | 9.00E-06 | | Voltage stability | | 9.00E-04 |

600

| Step | Duration | Voltage controller | Voltage drive | Vo1 | Vo2 |
|------|----------|--------------------|----------------|-----|-----|
| $t_1$ | $t_{w1}$ | $V_1$ | $V_{G1}$ | $V_{DC1}$ | 0 |
| $t_2$ | $t_{w2}$ | $V_2$ | $V_{G2}$ | $V_{DC1}$ | $V_{DC2}$ |
| $t_3$ | $t_{r2}$ | 0 | 0 | $V_{DC1}$ | $V_{DC2}$ |
| $t_4$ | $t_{f2}$ | $V_2$ | $V_{G2}$ | $V_{DC1}$ | $V_{DC2}$ |
| $t_5$ | $t_{r1} - (t_{w2} + t_{r2} + t_{f2})$ | 0 | 0 | $V_{DC1}$ | $V_{DC2}$ |
| $t_6$ | $t_{f1}$ | $V_1$ | $V_{G1}$ | $V_{DC1}$ | $V_{DC2}$ |
| $t_7$ | $t_{r2} - (t_5 + t_{f1})$ | 0 | 0 | $V_{DC1}$ | $V_{DC2}$ |
| $t_8$ | $t_{f2}$ | $V_2$ | $V_{G2}$ | $V_{DC1}$ | $V_{DC2}$ |

700

900

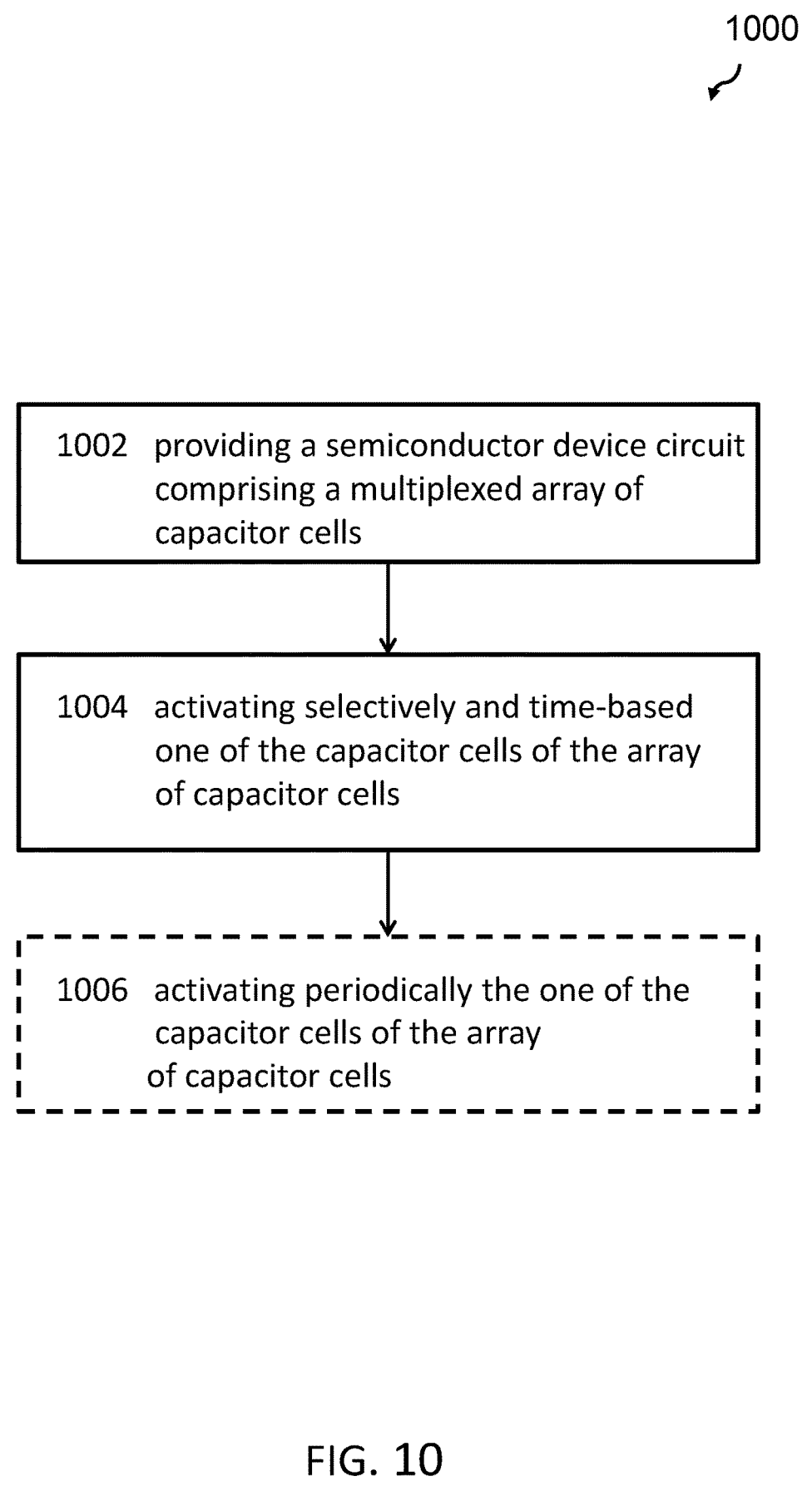

1000

1002   providing a semiconductor device circuit comprising a multiplexed array of capacitor cells 1004   activating selectively and time-based one of the capacitor cells of the array of capacitor cells 1006   activating periodically the one of the capacitor cells of the array of capacitor cells

FIG. 10

SCALABLE QUBIT BIASING DEVICE BASED ON MULTIPLEXED CHARGE STORAGE

BACKGROUND

The present application relates generally to a semiconductor device circuit, and more particularly, to a semiconductor device circuit for biasing gates of a qubit device. The present application further relates to a method for operating the semiconductor device circuit for biasing gates of a qubit device.

Quantum computing continues to be one of the hottest topics in physical science, the industry and in research. Classical digital computers and/or processors are slowly reaching their physical limitations, so research is looking for new ways to address mathematical and other problems that cannot be solved by classic von-Neumann machines due to the physical limitations in terms of structure size, power consumption and ultimately speed of processing. Also, commercial enterprises are interested in the new computing options.

Quantum computing is therefore one of the promising areas to achieve quantum supremacy, i.e., a real advantage in addressing very complex computation or tasks in a reasonable amount of time. As is well known, conventional computers encode process information in bits, i.e., "1"s and "0"s. Quantum computers, on the other hand, are based on so-called qubits which operate according to two key principles of quantum physics: superposition and entanglement. Superposition describes a situation that each qubit can represent both, a 1 and a 0 inference between possible outcomes for an event. Entanglement means that qubits in superposition can be correlated with each other in a non-classical way, i.e., the state of one qubit, whether it is a 1 or a 0 or both, can depend on the state of another and that there is more information contained in qubits when they are entangled compared to single ones.

SUMMARY

According to one aspect of the present invention, a semiconductor device circuit for biasing gates of a qubit device may be provided. The semiconductor device circuit may include a multiplexed array of capacitor cells. Thereby, the following may apply to an array of capacitor cells: each capacitor cell may include a transistor-controlled capacitor, each capacitor may be connected between the drain of a respective transistor and ground, each source of all transistors of all capacitor cells may be connected to a common control point, and each gate of the transistors of the capacitor cells may be individually voltage controllable.

Furthermore, the semiconductor device circuit may include a charging unit connected to the common control point, and a discharging unit connected to the common control point, where the charging unit and the discharging unit are alternatively activatable.

According to another aspect of the present invention, a method for operating a semiconductor device circuit for biasing gates of a qubit device may be provided. The method may include providing a semiconductor device circuit including a multiplexed array of capacitor cells. For the multiplexed array of capacitor cells the following may apply: each capacitor cell may include a transistor-controlled capacitor, each capacitor may be connected between the drain of a respective transistor and ground, each source of all transistors of all capacitor cells may be connected to a common control point, and each gate of the transistors of the capacitor cells may be individually voltage controllable.

BRIEF DESCRIPTION OF THE DRAWINGS

It should be noted that embodiments of the invention are described with reference to different subject-matters. In particular, some embodiments are described with reference to method type claims, whereas other embodiments are described with reference to device type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be disclosed within this document.

The aspects defined below are apparent from the examples of embodiments to be described hereinafter and are explained with reference to the examples of embodiments, to which the invention is not limited.

Figure 1:
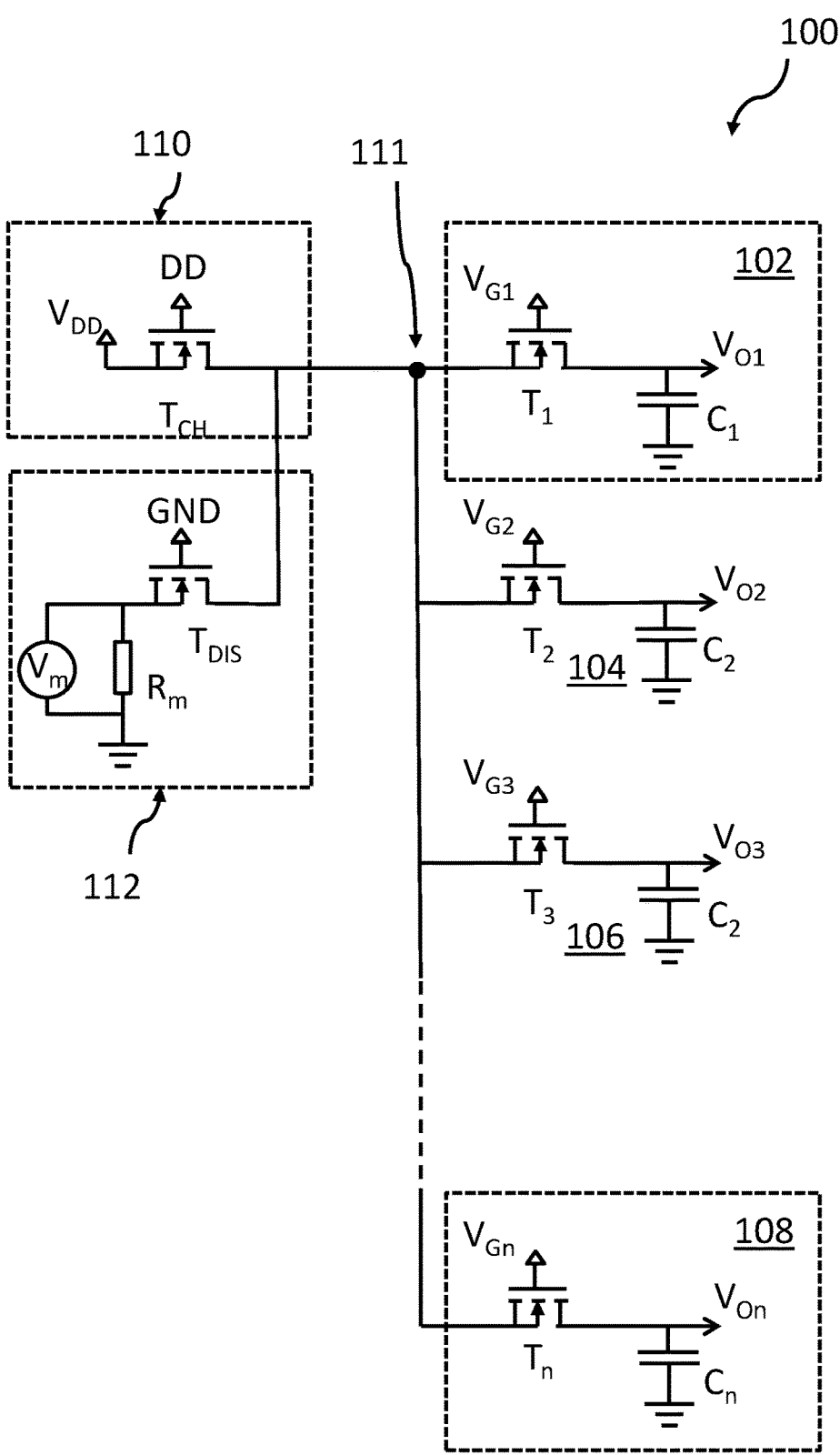
Figure 2:
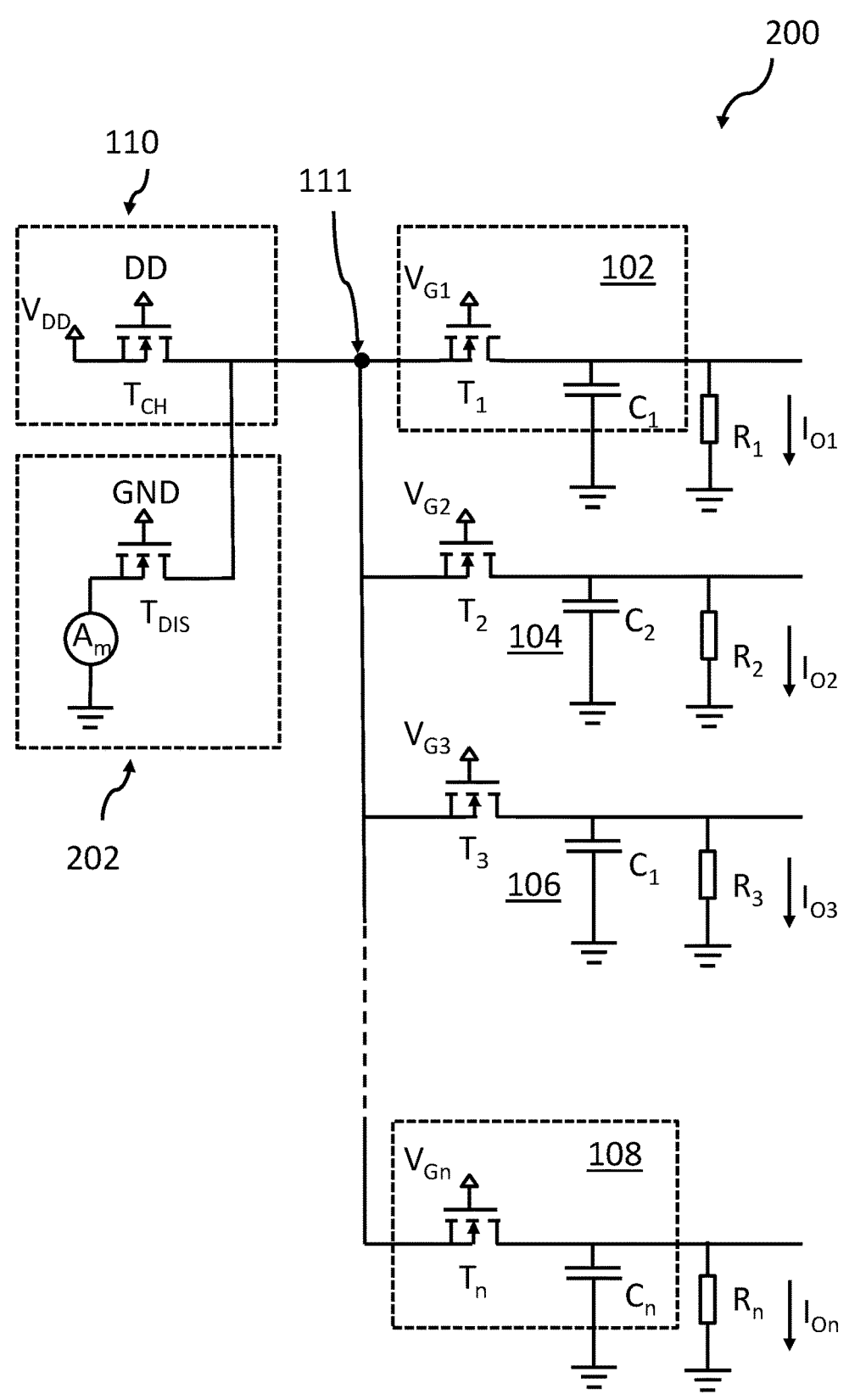
Figures 3A, 3B:
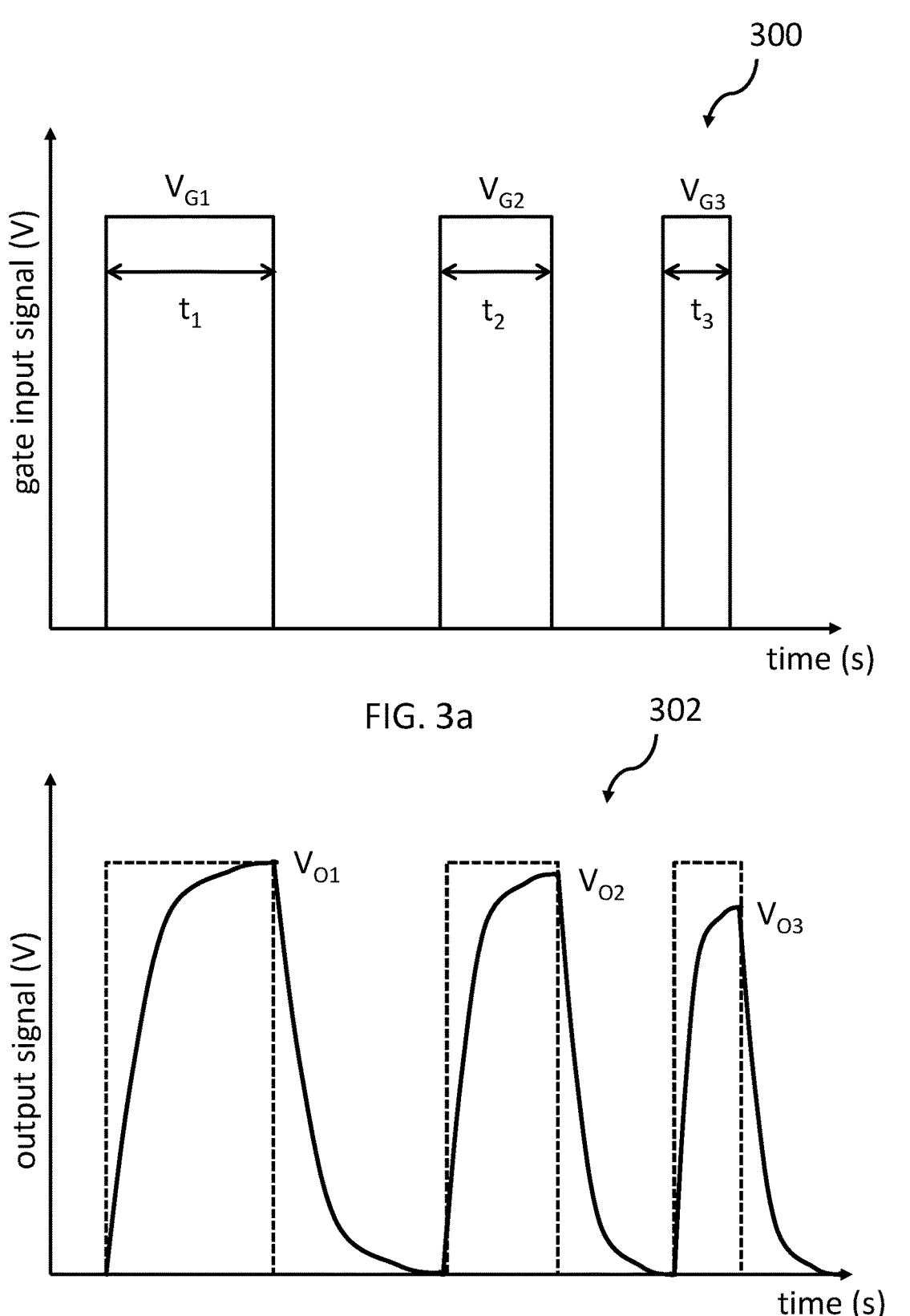
Figure 4:
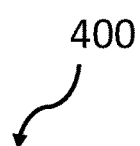
Figure 4:
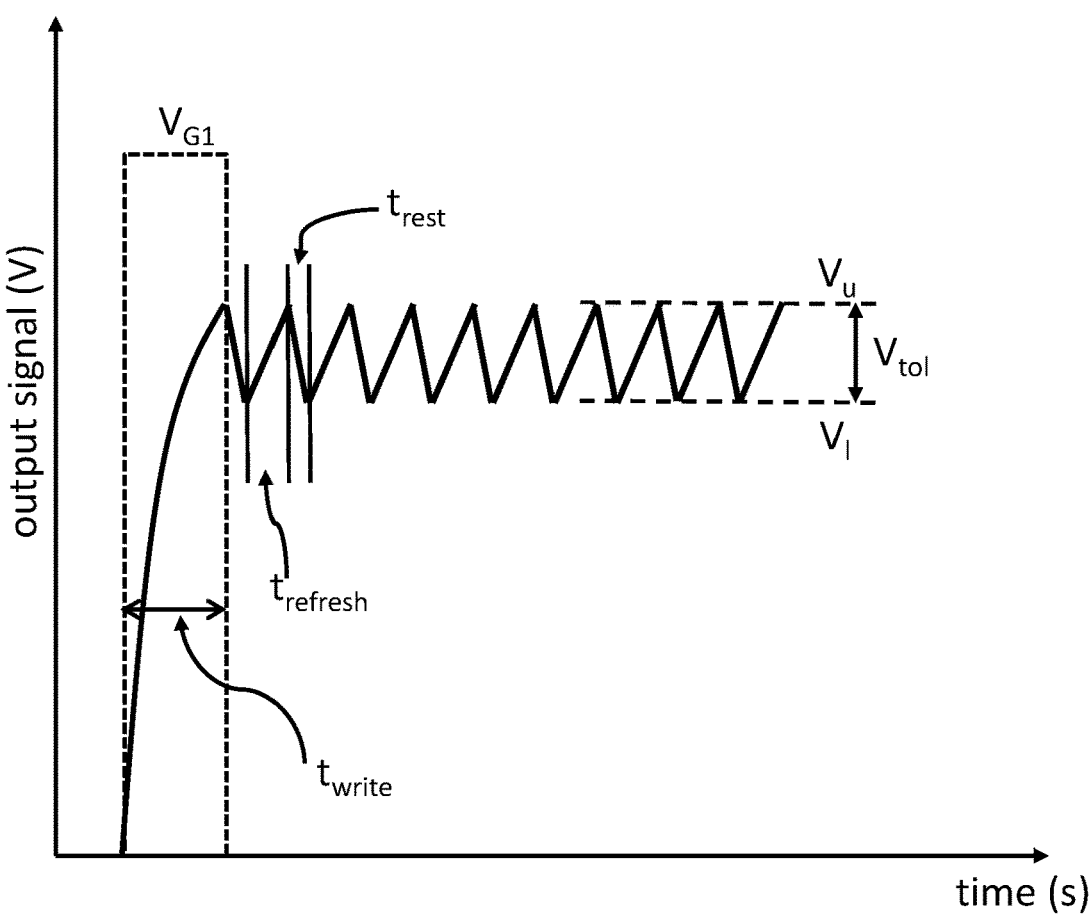
Figure 5:
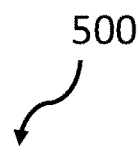
Figure 5:
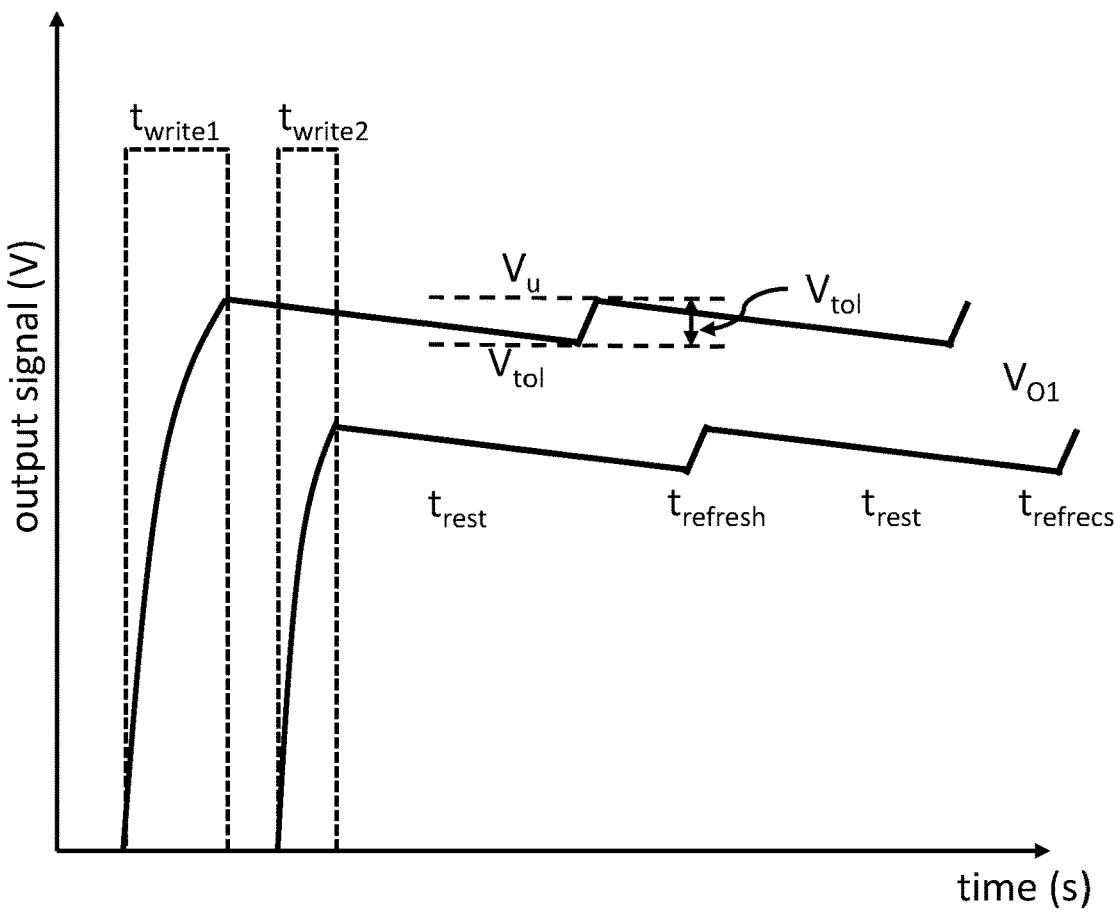
Figure 6:
Figure 6:
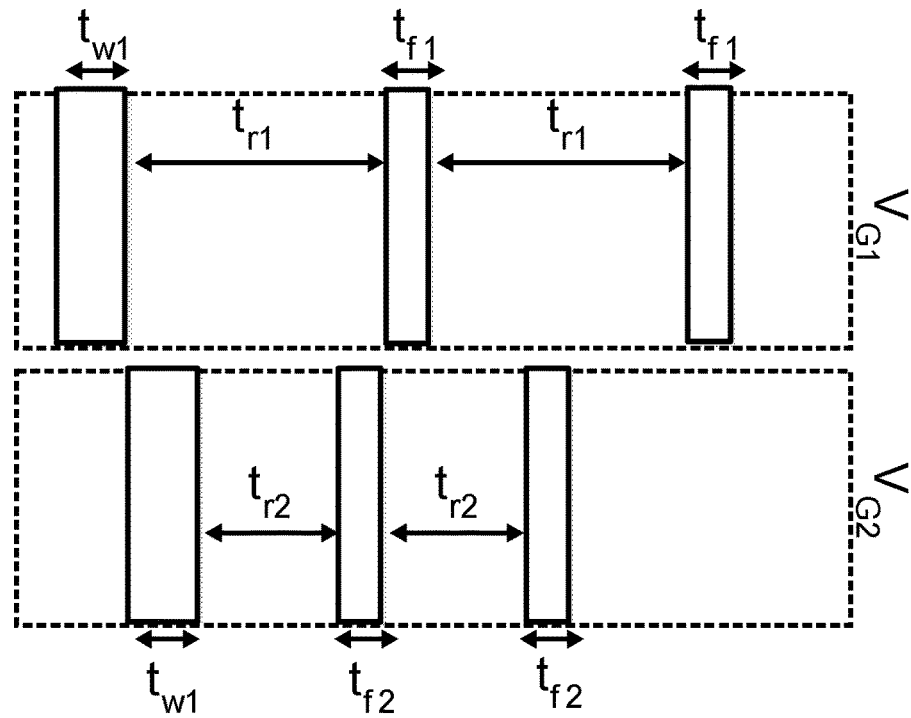
Figure 7:
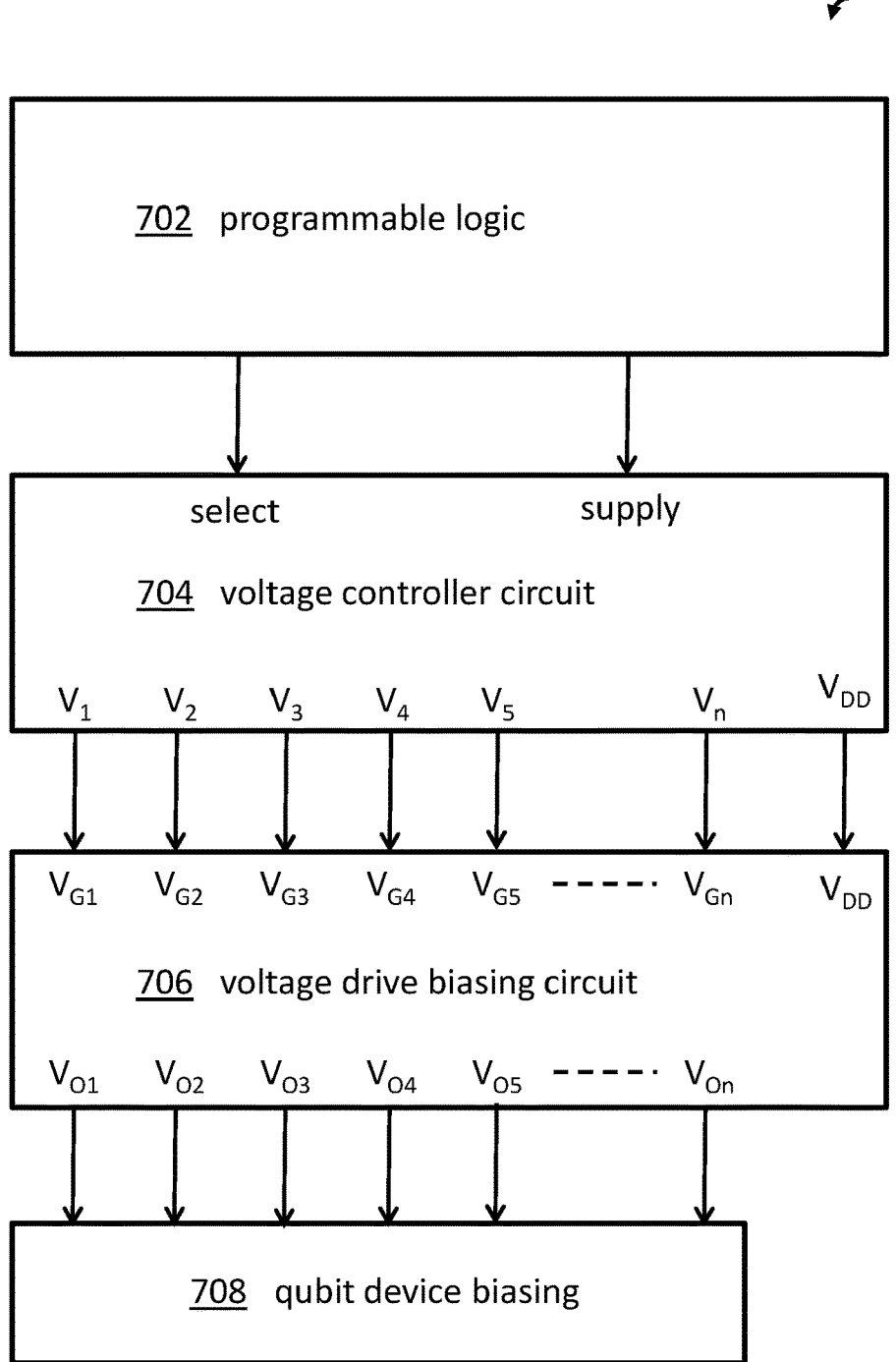
Figure 8:
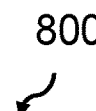
Figure 8:
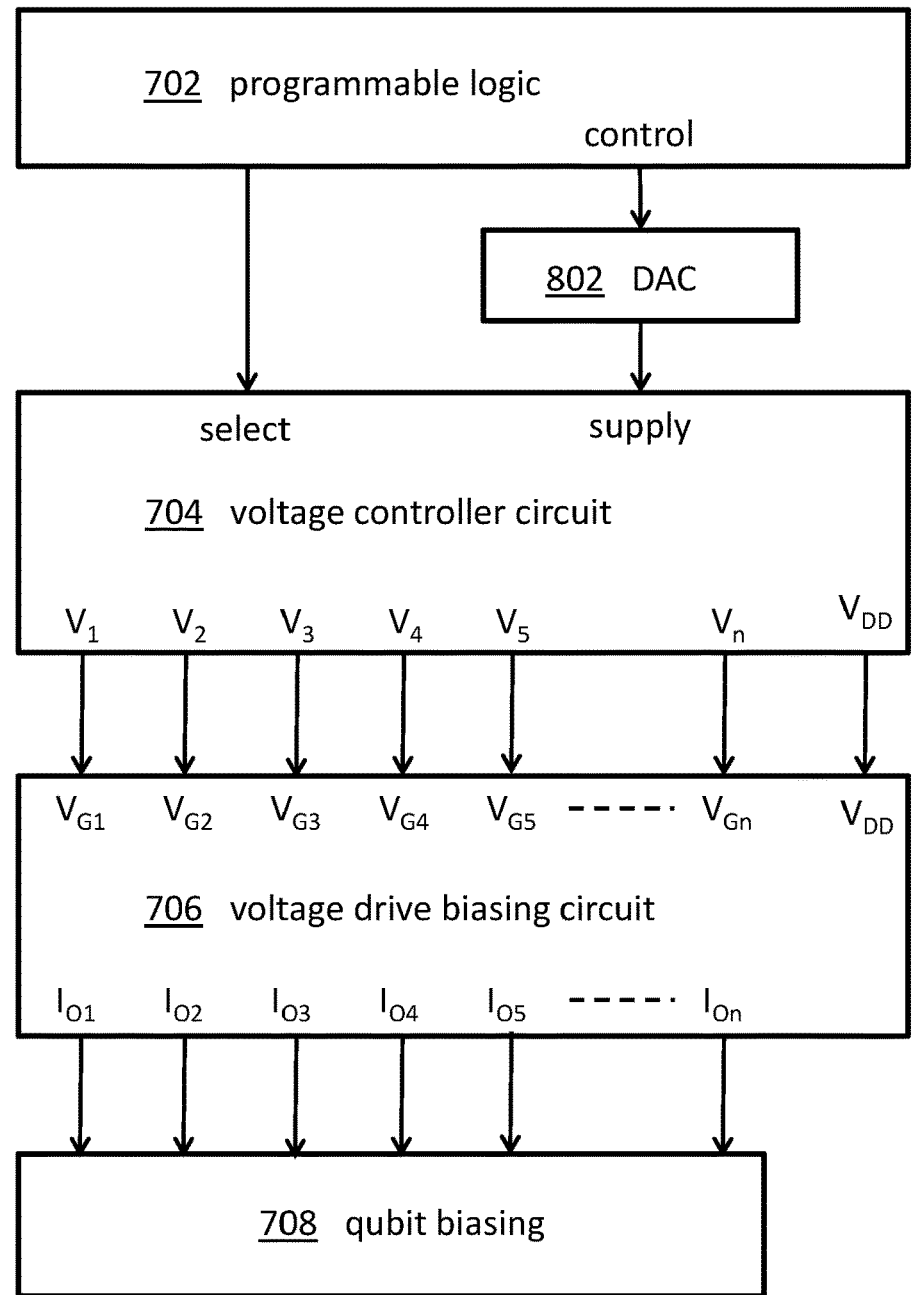
Figure 9:
Figure 9:
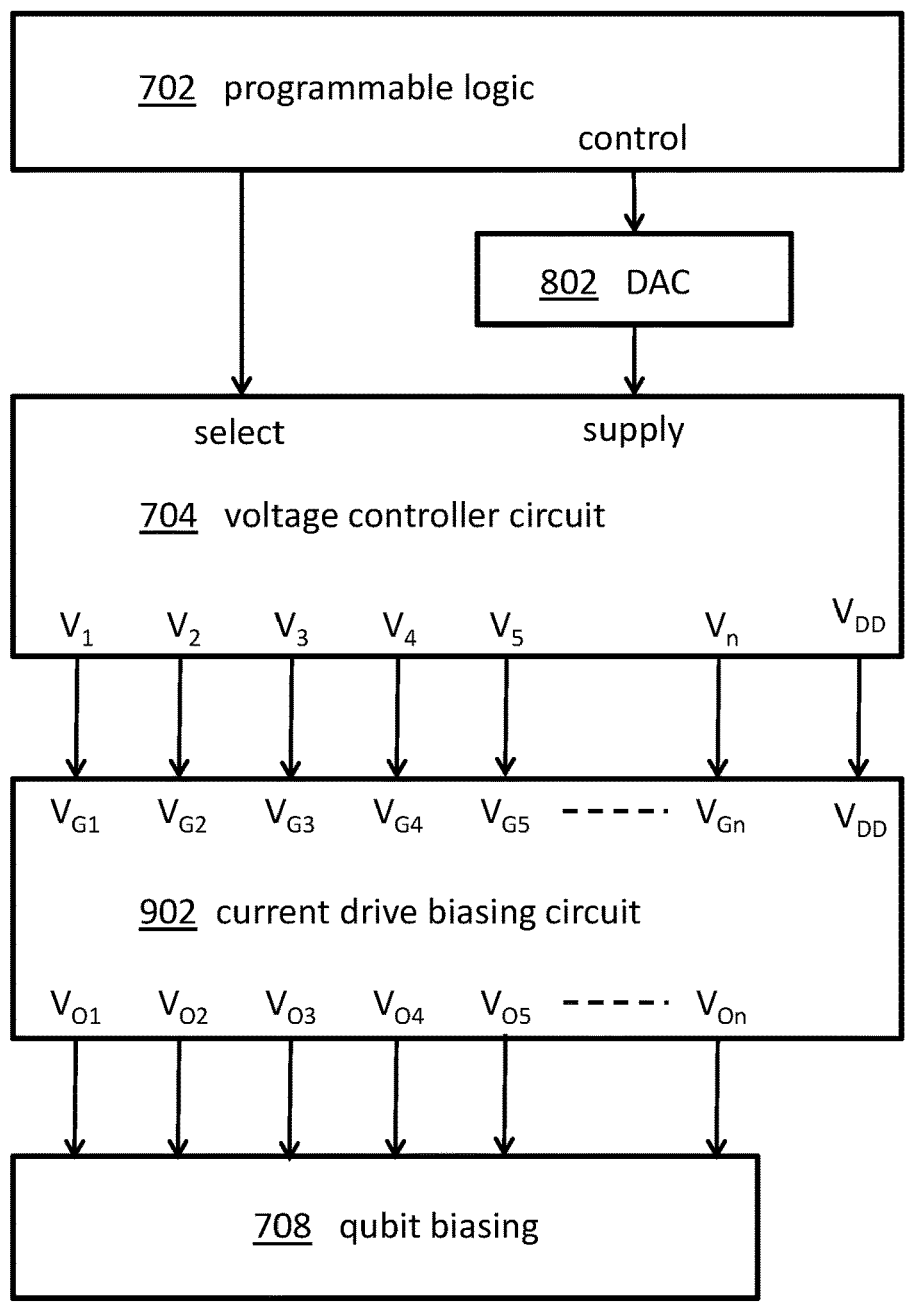

Preferred embodiments of the invention will be described, by way of example only, and with reference to the following drawings:

FIG. 1 shows a block diagram of an embodiment of the inventive semiconductor device circuit for biasing gates of a qubit device;

FIG. 2 shows a diagram including the block diagram of FIG. 1 in the context of a current drive biasing circuit;

FIG. 3a, b show diagrams in which different gate voltages $V_{G1}$, $V_{G2}$ and $V_{G3}$ of different capacitor cells are activated as well as corresponding output voltages;

FIG. 4 shows an activation voltage $V_{G1}$ for a certain amount of time, namely during $t_{write}$;

FIG. 5 shows another diagram with different write periods;

FIG. 6 shows a signal flow table of an illustrative control algorithm for a two output exemplary embodiment;

FIG. 7 shows a more complete voltage drive biasing example;

FIG. 8 shows another voltage drive biasing circuitry using a DAC;

FIG. 9 shows a further current drive biasing circuitry using a DAC; and

FIG. 10 shows a flowchart describing a process of operating a semiconductor device circuit for biasing gates of a qubit device according to at least one embodiment.

DETAILED DESCRIPTION

Detailed embodiments of the claimed structures and methods are disclosed herein; however, it can be understood that the disclosed embodiments are merely illustrative of the claimed structures and methods that may be embodied in various forms. The present disclosure may, however, be embodied in many different forms and should not be construed as limited to the exemplary embodiments set forth herein. In the description, details of well-known features and techniques may be omitted to avoid unnecessarily obscuring the presented embodiments.

In the context of this description, the following technical conventions, terms and/or expressions may be used:

The term 'biasing gate' may denote a component of a qubit device for defining confinements for states of the active particles.

The term 'qubit device' may denote a physical device, currently typically operated in a temperature range below or much below 4K in order to manipulate physical states of elementary particles to enable quantum computing.

The term 'capacitor cell' may denote a component of the here proposed concept including a transistor and the capacitor, where the drain of the transistor is connected to a capacitor. The source of the transistor may be the input of the capacitor cell and the common point between the drain of the transistor and the capacitor may be the output of the capacitor cell. Via the gate of the transistor, the capacitor cell may be controlled. Hence, the capacitor cell may include a transistor-controlled capacitor.

The term 'array of capacitor cells' may denote a plurality of capacitor cells which may be activated in a multiplexed way. Additionally, all capacitor cells of the array may be connected to a common control point, namely via the source of the transistor of the capacitor cell.

The term 'common control point' may denote an electrical contact point, to which all inputs of all capacitor cells, as well as the output of the charging and the discharging unit may be connected.

The term 'individually voltage controllable' may denote that each output of a plurality of capacitor cells may have a different voltage level (or current).

The term 'charging unit' may denote a single unit using a transistor in the proposed semiconductor device circuit used to control the supply voltage input for each of the capacitor cells.

The term 'discharging unit' may denote a circuitry using another transistor that may be activated at times in which the charging unit may be deactivated in order to discharge one of the capacitors of one of the capacitor cells.

The term 'alternatively activatable' may denote that only one of the two, the charging unit and the discharging unit may be activated at the same time.

The term 'first control voltage' may denote a control signal to control the gate of the transistor of the charging unit.

The term 'second control voltage' may denote a control signal to control the gate of the transistor of the discharging unit and thus determine whether a current flows through the source/drain channel of the respective transistor. The second control voltage may be used in the voltage drive mode.

The term 'third control voltage' may denote a control signal to control the gate of the transistor of the discharging unit and thus determine whether a current flows from the source to the drain of the respective transistor. The third control voltage may be used in the current drive mode in which the current to ground may be measured.

The term 'quasi-constant' may denote that a voltage—in particular, the output of the capacitor cell—may be kept within a predefined tolerance range between an upper and lower voltage level.

The term 'time-based activation' may denote that an activation signal may be supplied to the unit to be controlled periodically.

The term 'control gate of a qubit device' may denote a component of a qubit device required for a confinement of active components of a qubit device. Typically, a qubit devices may include two or four control gates.

As previously discussed, quantum computing continues to be one of the hottest topics in physical science, the industry and in research. Classical digital computers and/or processors are slowly reaching their physical limitations, so research is looking for new ways to address mathematical and other problems that cannot be solved by classic von- Neumann machines due to the physical limitations in terms of structure size, power consumption and ultimately speed of processing. Also, commercial enterprises are interested in the new computing options.

However, to reach quantum supremacy—i.e., basically the ability to solve problems with quantum computing that cannot be solved using classical computing systems-a comparably large number of error-free basic quantum devices is required (potentially, together with error correction mechanisms). Furthermore, quantum devices are operated in a cryostat and very low temperatures. Typically, three temperature zones are used: (i) room temperature, i.e., about 300 K, (ii) 3K to 4K, and (iii) a temperature level at which the quantum devices/the quantum chip are/is actually operated, i.e., about 10 mK. Furthermore, almost all of the control electronics are operated at room temperature. On the other hand, quantum devices—in particular the larger number mentioned above-all require control signals, signal detection lines and input lines. Thus, with n qubits one can expect at least 2n coax cables reaching from room temperature down to the 10 mK area where the n qubit devices are operated, i.e., one cable for the signal controls, one for the biasing signals and one or less for the readout. For newer qubit devices, the number of total signal lines may even lie above. This represents a real challenge and bottleneck because typical coax cables require certain diameters so that it also becomes a real physical limitation.

Hence, a 1000 qubit machine would require a new level of control and another signal level management is required. Thereby, integrated electronics implemented on advanced CMOS nodes which can be operated in the 3K to 4 K temperature area promise higher density, improved scalability, low power consumption and comparably low costs.

However, current approaches have their limitations. Although DACs (digital-analog-converter) may be operated at 3K, they lack more comprehensive closed-loop control and feedback circuits or SRAM to store the DAC pattern. In other cases, it is necessary to provide a reference clock signal from the outside, i.e., from a room temperature waveform generator. In again other cases, noise from used CMOS chips may disturb the quantum states of the qubit devices or readout signals if they are driven all the way up to room temperature without any digitization.

In certain designs, like quantum dot qubit devices, even more control lines may be required to limit the degrees of freedom of the qubit to force them into concrete states. This may require even more control and/or signal lines from room temperature to the qubit chip.

As an example, document US 2019/0 164 959 A1 should be mentioned. It describes quantum integrated circuit assemblies that include quantum circuit components including a plurality of qubits and control logic coupled to the quantum circuit components and configured to control operation of those components, where the quantum circuit components and the control logic are provided on a single die. This document also describes methods for fabricating such assemblies.

Furthermore, a publication of the Delft University of technology titled should be mentioned: "Cryo-CMOS DAC for Multiplexed Spin-Qubit Biasing", by Luc Enthofen et al, DOI: https://doi.org/10.1109/VLSITechnologyand-Cir46769.2022.9830309, published 2022, also published in the proceedings of the 2022 IEEE Symposium on VLSI Technology and Circuits, VLSI Technology and Circuits conference. This paper presents a 15b cryo-CMOS DAC for multiplexed spin-qubit biasing implemented in a 22-nm FinFET process. The integrated DAC architecture and the robust digitally-assisted high-voltage output stage enable a low power dissipation (157 µW) and small area (0.08 mm²) independent of the number of biased qubits, and a 3V output range well beyond the nominal supply.

However, the problem remains that too many control signals and cables may be routed from room temperature to the operating temperature of the quantum chip, so there is a need for a simple and cost-effective, but powerful device for controlling a number of gate biasing of qubit devices.

Therefore, a semiconductor device for biasing gates of a qubit device is highly desirable. Presently described embodiments including semiconductor device circuits for biasing gates of a qubit device may include a multiplexed array of capacitor cells. Thereby, the following may apply to an array of capacitor cells: each capacitor cell may include a transistor-controlled capacitor, each capacitor may be connected between the drain of a respective transistor and ground, each source of all transistors of all capacitor cells may be connected to a common control point, and each gate of the transistors of the capacitor cells may be individually voltage controllable.

Furthermore, the semiconductor device circuit may include a charging unit connected to the common control point, and a discharging unit connected to the common control point, where the charging unit and the discharging unit are alternatively activatable.

According to another aspect of the present invention, a method for operating a semiconductor device circuit for biasing gates of a qubit device may be provided. The method may include providing a semiconductor device circuit including a multiplexed array of capacitor cells. For the multiplexed array of capacitor cells the following may apply: each capacitor cell may include a transistor-controlled capacitor, each capacitor may be connected between the drain of a respective transistor and ground, each source of all transistors of all capacitor cells may be connected to a common control point, and each gate of the transistors of the capacitor cells may be individually voltage controllable.

Additionally, presently described embodiments of semiconductor device circuits may include a charging unit connected to the common control point, and a discharging unit connected to the common control point, where the charging unit and the discharging unit may be alternatively activatable.

Furthermore, presently described methods for utilizing illustrative embodiments including semiconductor device circuits may include activating selectively and time-based one of the capacitor cells of the array of capacitor cells.

The proposed semiconductor device circuit for biasing gates of a qubit device may offer multiple advantages, technical effects, contributions and/or improvements:

The proposed semiconductor device circuit may address the problem that the external electronics of quantum computers cannot yet be scaled very well. The proposed solution may also enable a much better form factor and cost reductions—i.e., for racks of AWGs (quantum arbitrary waveform generators)—a reduction of the thermal load on the cooling equipment, and an overall reduced power consumption. This may be achieved by a much better scaling of DC current and voltage signals, in particular for electrostatic control of spin qubit devices, as well as for superconducting qubits by controlling currents (e.g., flux control) in a multiplexed way. Additionally, it may ease the way to new qubit device variants which may require even more control lines as today's qubit devices.

The proposed circuit may be able to take a digital signal and a DC voltage as inputs and generate a range of different voltages or currents as outputs in a multiplexed way. Thereby, the circuit may be suitable to generate the DC control signals required for spin and superconducting qubits in a scalable manner meaning that a significantly lower number of input signals and cables may be required to control the functionality of the qubits. In particular, the circuit may be well enabled to control many biasing gates for qubit devices because the multiplexing happens in the 3K to 4K temperature range and not at room temperature.

The multiplexing of a quasi-constant voltage or current may be achieved by refreshing the capacitor cells of the circuit. Thereby, different voltage level per addressed biasing gate may be possible. Due to the very large discharging time of the capacitor in comparison to the required charging time, the on/off-ratio may be in the range of $10^4$ to $10^6$. As a result, hundreds or even thousands of gates may be controllable with one single circuit. This may reduce the required amount of equipment—e.g., cabling from room temperature to the temperature level of the qubit devise—as well as operating complexity.

The combination of the local charge storage—i.e., the capacitor of the capacitor cell—with a multiplexed charge refresh operation may enable these benefits, i.e. the ability to generate a multitude of quasi-static DC signals for controlling qubit devise gates. By controlling three (explained in more detail below) charge refresh time constants, it is possible to obtain DC signal level control using only one digital control signal. This kind of signal generation may be well suited to be tightly integrated with qubit devices to supply the required DC control signals. Hence, compared to other approaches such as using DACs (digital analog converters) the proposed concept may be much more energy-efficient and compact to generate large numbers of quasi-DC levels.

Furthermore, the quasi-constant voltage or current levels may be achieved in two ways: (i) by changing the duty cycle of the control signals for the transistors of the capacitor cells while keeping the frequency constant, or (ii) by changing the frequency of the control signal itself while keeping the duty cycle constant. Also this may contribute to the flexibility of the proposed concept. In particular, controlling the frequency is attractive, since this may be done through relatively simple circuitry, namely, voltage-controlled oscillators. In this sense, a single voltage-controlled oscillator, together with control logic and the proposed invention, may control the generation of a large number of DC qubit biasing levels. This is a significantly more efficient solution, in terms of power and complexity, compared to standard approaches today.

In the following, additional embodiments of the inventive concept-applicable in large parts for the semiconductor device circuit as well as for the method-will be described.

According to an embodiment of the presently described semiconductor device circuits, the charging unit may include a transistor, the drain of which may be connected to the common control point, the source of which may be connected to a supply voltage, e.g. $V_{dd}$, and the gate of which may be connectable to a first control voltage for activation of the charging unit. Hence, the transistor may be operable in a typical switching mode, where the switching mode may depend on the first control voltage. I.e., the source/drain line may be either open or closed controlled by the gate voltage.

According to another described embodiment of the presently described semiconductor device circuit, the discharging unit—in particular, in a voltage drive mode—may include a transistor whose drain may be connected to the common control point, which source may be connected to ground via a resistor, and whose gate may be connectable to a second control voltage for an activation of the discharging unit. This may allow measurement of the amount of charge, i.e., measured as voltage that may have been stored in the capacitor of a selected one of the capacitor cell. This mode of operation may be denoted as voltage drive mode.

According to yet another embodiment of the presently described semiconductor device circuits, the discharging unit—in particular, in a current drive mode—may include a transistor whose drain may be connected to the common control point, whose source may be connected via a current measurement unit to ground, and whose gate may be connectable to a second control voltage for an activation of the discharging unit. The measurement may be performed using the voltage decrease over a resistor (i.e., the current measurement unit). This mode of operation may be denoted as current drive mode.

According to another embodiment of the presently described semiconductor device circuits, a voltage level at the drain of the transistor of the capacitor cell may be kept quasi-constant by a time-based activation—i.e., a continuous reactivation with a constant frequency—of the gate of the transistor of the respective capacitor cell. Thereby, the drain of the transistor may be coupled to one connector of the capacitor (while the other contact point of the capacitor is, e.g., connected to ground) as well as to a qubit gate. Since only leakage currents may flow, "quasi-constant" may be equivalent to a loss of the capacitor from one of the time-based activation cycles ranging of less than 5%, less than 3%, less than 2% and where less than 1% may be achievable.

In other embodiments, the circuit may be adapted to be operable in a 3K environment. Approximately 3K/4K represents the temperature range, in which typical control units and control logic may be operated in order to control an operation of qubit devices and/or qubit chips that may be operated in a 10 mK temperature range.

According to another embodiment of the semiconductor device circuit, a signal level at the drain of the transistor of a capacitor cell may represent a bias voltage level for a control gate of a qubit device. Hence, the drain contact of the transistor of the capacitor cell may be brought into electrical contact with the control gate of the qubit device. No further electric components may be required. Hence, this is a very direct, technology-wise clean solution for controlling a larger plurality of biasing gates of qubit devices without the requirement for coax cables reaching to room temperature.

According to another embodiment of the presently described semiconductor device circuits, a discharging time of the capacitor of a capacitor cell may be at least 1000 times larger than a charge time. This may be dependent on the load and leak currents. However, experiments have shown that a factor of up to 1,000,000 should be possible.

According to another embodiment of the presently described semiconductor device circuits, each transistor in the circuit is of type n-enhancement. Such type of transistors are comparably easy to manufacture and operable in a 3K/4K temperature range.

According to a further possible embodiment, presently described semiconductor device circuits—in particular, the capacitor cell—may also include a resistor in parallel to the capacitor of the capacitor cell. This may allow to generate a controlled discharge current, e.g., a flux control that may be used for changes in the superconducting qubit properties due to magnetic field that the flow of the current may produce.

For an illustrative proposed method, the following additional embodiments may contribute to the advantages of the proposed concept:

According to one embodiment, the method may also include activating the charging unit by connecting a gate of a transistor of the charging unit to a first control voltage. The source of the transistor of the charging unit may be connected to a supply voltage, and a drain of the transistor of the charging unit may be connected to the common control point. In embodiments, the method may further include deactivating the discharging unit by connecting a gate of a transistor of the discharging unit to ground. Hence, controlled electrical fields at the biasing gates of one or more qubit gates or chips may be achieved by selecting the respective capacitor cell and activating the charging unit.

According to another embodiment, the method may also include activating periodically—i.e., using a fixed frequency—one of the capacitor cells of the array of capacitor cells, by applying a recharge voltage to the gate of the transistor of the respective capacitor cell, thereby achieving a quasi-constant voltage level at the drain of the transistor of the one capacitor cell. This way, a multiplexing for a plurality of capacitor cells may be achieved and, hence, a multiplexing for a plurality of biasing gates of qubit devices.

According to another embodiment, the method may further include activating periodically—i.e., again using a fixed frequency—another capacitor cell of the array of capacitor cells than the one of the capacitor cells, thereby achieving, e.g., another quasi-constant voltage level at the drain of the transistor of the other capacitor cell. In combination with the subject-matter described in the paragraph above, the different capacitor cells may be activated in, e.g., a round robin manner. Furthermore, if more capacitor cells may be available, they may be activated in a more general multiplexed way.

According to yet another embodiment, the method may also include controlling—in particular, in the sense of changing, increasing/decreasing-a frequency of an activation of the one of the capacitor cells while leaving a duration of the activation constant, in particular within the period of the activation. Thereby, a quasi-constant voltage level-potentially of another level—may also be influenced at the drain of the transistor of the other capacitor cell. Hence, the quasi-constant voltage level at an output of the capacitor cell may be influenced by a time of activation, i.e., an activation voltage at the gate of the transistor of the capacitor cell or, by a frequency of the activation.

According to another embodiment, the method may also include activating the discharging unit by connecting a gate of a transistor of the discharging unit to a second control voltage. Additionally, a drain of the transistor of the discharging unit may be connected to the common control point. Furthermore, the charging unit may be deactivated at the same time, e.g., by connecting a gate of a transistor of the charging unit to ground. The discharging effect may be achieved by connecting a source of the transistor of the charging unit via a discharging unit resistor to a ground, and a drain of the transistor of the charging unit connected to the common control point. It may be understood that either the charging unit or the discharging unit may be activated in order not to produce a sort of shortcut.

According to another embodiment, the method may also include measuring a voltage over the discharging unit resistor. Thereby, the voltage level of the capacitor of the capacitor cell may be measured. This may allow to determine the amount of electrical charge accumulated at the capacitor.

According to an alternative embodiment, the method may also include connecting an output-side resistor in parallel to a capacitor of a capacitor cell, and activating periodically the one of the capacitor cells of the array of capacitor cells. Thereby, a periodic current—that may again be quasi-constant-through the output-side resistor may be applied. This type of operating the circuitry may be denoted as current drive biasing mode. It may be, e.g., used for a flux control for qubits, where the current implies a magnetic field that may affect a superconducting qubit device. It may also be noted that the method embodiments above this paragraph may describe voltage drive biasing or voltage drive biasing circuits.

In the following, a detailed description of the figures will be given. All instructions in the figures are schematic. Firstly, a block diagram of an embodiment of the inventive semiconductor device circuit for biasing gates of a qubit device is given. Afterwards, further embodiments, as well as embodiments of the method for operating a semiconductor device circuit for biasing gates of a qubit device will be described.

FIG. 1 shows a block diagram of a preferred embodiment of the semiconductor device circuit 100 for biasing gates of a qubit device. FIG. 1 shows an illustrative voltage drive biasing circuit. The semiconductor device circuit 100 includes a multiplexed or multiplexable array of capacitor cells 102, . . . 108. Thereby, each capacitor cell 102, . . . 108 includes a transistor-controlled capacitor $C_1$, . . . . $C_n$, connected between the drain of a respective transistor $T_1$, . . . . $T_n$ and ground. The common point between the transistor and the capacitor of a capacitor cell may also be the contact point for a biasing gate of a qubit device.

Furthermore, each source of all transistors $T_1$, . . . . $T_n$ of all capacitor cells 102, . . . 108 are connected to a common control point 111, and each gate of the transistors $T_1$, . . . . $T_n$ of the capacitor cells is individually voltage controllable. By selectively activating the charging unit 110 as well as the respective transistor of a capacitor cell with a cyclic activated gate voltage $V_{Gi}$, i=1, . . . n, the output terminals $V_{Oi}$, i=1, . . . n can selectively be activated with a predefined amount of charge to generate a predefined quasi-constant voltage level over the capacitor of the capacitor cell. For this, the charging unit 110 is instrumental as it is connected to the common control point 111.

In embodiments, to operate the semiconductor device circuit in another mode, the discharging unit 112, which is connected to the common control point 111, can be activated if the charging unit 110 is deactivated, i.e., if no control voltage is connected to the gate of the transistor $T_{CH}$. Instead, the gate of the transistor $T_{DIS}$ is activated. The source of the transistor $T_{DIS}$ of the discharging unit is connected the common control point 111 via the measurement resistor $R_m$ to ground. Using the voltage measurement unit (e.g., a volt meter), it is possible to measure the voltage over the capacitor $C_1$ and it's time characteristic, i.e., its behavior when discharging the respective capacitor $C_i$. To achieve this, the gate of the capacitor cell should also be activated by a control voltage.

In order to implement these two modes of operation, the charging unit and the discharging unit are alternatively activatable; i.e., only the charging unit or (exclusive or) the discharging unit can be activated.

FIG. 1 depicts an illustrative embodiment including a voltage drive biasing circuit, where $V_{O1}$, . . . . $V_{On}$ is activated sequentially, i.e., one at a time, i.e., in multiplexed mode.

FIG. 2 shows a diagram 200 including the same three building blocks as already discussed in the context of FIG. 1, namely the plurality of capacitor cells 102, . . . 108, the charging unit 110 and a (slightly modified) discharging unit 202. However, in this embodiment, a current drive biasing circuit is implemented that has a modified discharging unit 202. In comparison to the discharging unit 112 (compare FIG. 1), a current measurement unit, e.g., an ampere-meter is connected between the source of the transistor $T_{DIS}$ (discharge transistor) to implement a current drive biasing circuit.

Furthermore, respective resistors $R_i$, i=1, . . . n are connected in parallel to the capacitor $C_i$ of each capacitor cell 102, . . . 108 through which a respective current $I_{Oi}$, I=1, . . . n is flowing. In this operation mode, i.e., current drive mode, a voltage controller controls (compare FIG. 7, 8; ref. num 704) multiple $V_1$, . . . . $V_n$ in parallel (instead of sequential, as in the voltage drive mode) in order to activated a plurality (or all) of the capacitor cells.

FIG. 3a shows a diagram 300 in which different gate voltages $V_{G1}$, $V_{G2}$ and $V_{G3}$ of different capacitor cells are activated for different time periods $t_1$, $t_2$, and $t_3$. Thereby, the Y-axis corresponds to a voltage level of the gate control signals and the X-axis represents the time.

Correspondingly, FIG. 3b shows a diagram 302 with corresponding output signals—in particular, on the Y-axis of the capacitor cells, where the X-axis represents the time again. It can be seen that for the first time period $T_1$ the voltage level $V_{O1}$ of the respective output signal (measured at) is higher than for the shorter time periods $T_2$ and $T_3$: $V_{O1}>V_{O2}>V_{O3}$. Especially, FIG. 3b should be seen as a comprehension basis for the subsequent figures.

FIG. 4 shows a diagram 400 with an activation voltage $V_{G1}$ for a certain time period, here denoted as $t_{write}$. As long as the gate signal $V_{G1}$ is active at the gate of the transistor of the respective capacitor cell, the output signal $V_{O1}$ grows. Then, during the time $t_{rest}$ the output signal $V_{O1}$ decreases, mainly due to leakage currents, until a refresh signal during the time $t_{refrech}$ becomes again active at the gate of the transistor of the respective capacitor cell. As a consequence, the output signal varies between a lower voltage value $V_1$ (1=low) and an upper voltage value $V_u$ (u=up). It should be clear that the output signal has a certain tolerance $V_{tol}$.

For the controlled parameters, the following applies:

$t_{write}$: during this time, the target voltage $V_O$ initializes the capacitor cell, and $$Q_w = C * V_{DD} * \left(1 - e^{-(t\_write/RC)}\right)$$

and $$V_O = Q_W / C$$

$t_{rest}$ is used to create the quasi-static $V_O$ signal. This is needed since the charging bias $$VDD \neq V_O,$$

and $$V_{u,d} = V_{o,u} * e^{-(t\_rest/RC)})$$

and $$Qrest = C * V_{o,u} * e^{-(t\_rest/RC)}.$$

$t_{refresh}$ brings the output signal back to the $V_O$ target:

$$Q_{refesh} = Q_{rest} + C * V_{DD} * \left(1 - e^{-(t\_refresh/RC)}\right)$$

It should be also understood that the discharge of the capacitor of the capacitor cell happens due to leakage. This happens particularly when the output of the capacitor cell—i.e., $V_O$—is connected to a gate of a spin qubit, since, such a gate also has some leakage. Practical examples have shown that the discharge time is in the range of seconds, meaning $t_{rest} >> t_{refresh}$. As a consequence, the DC level at a potentially connected gate of a qubit is quite static and a high multiplexing ratio can be supported between different ones of the capacitor cells, i.e., different ones of the connected qubit gates.

In contrast, for a current drive bias circuit, the capacitor needs to be continuously charged and then discharged through a resistor, as already shown above.

FIG. 5 shows another diagram 500 with different write periods, namely $t_{write1}$, $t_{write2}$. In this diagram, the relationship between $t_{rest}$ and $t_{refresh}$ is shown not as compressed in the x-direction as in the previous figure. However, the ratio represented realistically here either. Again assuming that the discharge of the capacitor of the capacitor cell is due to leakage, then the RC time constant is controlled by the gate voltage of the transistor at each capacitor: i.e., $R_{ON}$. In the on-state, $R_{ON}$ is very small and so the RC driven time constant is close to the RC time constant of the external parasitics, i.e., charging is fast.

In the off-state, the channel resistance is $R_{OFF}$ which is in the order of 1 MOhm to 1 GOhm, meaning discharging is comparably slow. And on/off-ratio of $10^4$ to $10^6$ (or even greater), can be expected. This factor can be leveraged towards higher multiplexing and flatter DC level (i.e., $V_{G1}$ levels).

Thus, the voltage stability factor with a multiplexing factor M is given as:

$$VS = (R_{ON} / R_{OFF}) * (M - 1).$$

In the lower part of FIG. 5, some examples are shown, showing that the voltage stability can be expected to be very high, i.e., quasi-constant.

FIG. 6 shows a signal flow table 600 of an illustrative control algorithm usable with an exemplary embodiment for a two output example—i.e., 2 capacitor cells, presented as stable in the upper half of FIG. 5. The lower half of FIG. 5 shows a visual representation of the two-output example. The abbreviations are as follows:

$t_{wn}$: write time for output n;

$t_{rn}$: rest time for output n;

$t_{fn}$: refresh time for output n;

$V_n$: controller signal;

$V_{Gn}$: drive gate signal; and $V_{DCn}$: output signal.

In another embodiment, the voltage controller can output multiple parallel control signal; in this case, the algorithm is always like a single-output example. For this, the following table may be exemplary:

| step | duration | voltage controller | voltage drive | $V_{O1}$ |
|------|----------|--------------------|--------------|----------|
| $t_1$ | $t_{w1}$ | $V_1$ | $V_{G1}$ | $V_{DC1}$ |
| $t_2$ | $t_{r1}$ | 0 | 0 | $V_{DC1}$ |
| $t_3$ | $t_{f1}$ | $V_1$ | $V_{G1}$ | $V_{DC1}$ |
| $t_4$ | $t_{r1}$ | 0 | 0 | $V_{DC1}$ |
| $t_5$ | $t_{f1}$ | $V_1$ | $V_{G1}$ | $V_{DC1}$ |

FIG. 7 shows a more complete voltage drive biasing example 700. At the bottom, the signals for the qubit biasing 708 are shown (symbolically), e.g., connected to one or more gates of one or more qubit devices, e.g., spin qubit devices and/or super conducting qubit devices.

To control exemplary qubit devices according to presently described embodiments, a programmable logic 702—e.g., a "program" for a quantum computing system—can be provided. Selected supply signals go from the programmable logic 702 to the voltage controller circuit 704. Here, the digital signals $V_1, \ldots V_n$ are generated and provided to the gates of the voltage drive bias circuit 706, e.g., as discussed in the context of FIG. 1. The voltage drive biasing circuit 706 finally provides the voltage output signals $V_{O1}, \ldots V_{On}$ to be used as qubit device biasing signals, i.e., connected to qubit device gates. Thereby, the following signals characteristics may be used:

select: digital signal, $V_1, \ldots, V_n$: digital signal, $V_{DD}$: supply bias, $V_{G1}, \ldots, V_{Gn}$: digital signals, and $V_{O1}, \ldots, V_{On}$: analog signals.

FIG. 8 shows a block diagram which is very similar to FIG. 7 for an illustrative voltage drive biasing circuit. Equal control blocks are shown with the same reference numbers. The visible difference is that a digital analog converter (DAC) 802 converts the digital control signal to an analog supply voltage such that the target output signal levels can be controlled through the DAC at the supply side of the voltage controller circuit. In this case, the charging voltage/current is controlled by generating a correct supply voltage level at the DAC and fully charging the capacitors, rather than controlling the capacitor circuit charging time constant. The benefit of such a solution is a reduced operating complexity. This comes at the cost of an increased DC power requirement and slightly reduced scalability.

FIG. 9 shows a comparable block diagram which is also very similar to FIG. 7, however, for a current drive biasing circuit. The main difference here is that the voltage drive biasing circuit (compare FIG. 8) has been replaced by the current drive biasing circuit 902, as discussed in the context of some of the figures above.

Lastly, FIG. 10 shows a block diagram of an exemplary method 1000 for operating an illustrative semiconductor device circuit for biasing gates of a qubit device according to at least one embodiment. The method includes providing, at 1002, a semiconductor device circuit include a multiplexed array of capacitor cells with the following characteristics: each capacitor cell includes a transistor-controlled capacitor; each capacitor is connected between drain of a respective transistor and ground; each source of all transistors of all capacitor cells are connected to a common control point; each gate of the transistors of the capacitor cells are individually voltage controllable; a charging unit connected to the common control point; and a discharging unit connected to the common control point, where the charging unit and the discharging unit are alternatively activatable.

The method 1000 further includes activating, at 1004, selectively and time-based one of the capacitor cells of the array of capacitor cells. The activation of the capacitor cells be performed in a multiplexing way.

As an optional and exemplary additional step, method 1000 may further include, at 1006, activating, periodically the one of the capacitor cells of the array of capacitor cells. Many other optional method steps are possible as can be seen from the chapter 'summary of the invention' of this document.

The terminology used herein is for the purpose of describing particular embodiments only and is not intended to limit the invention. As used herein, the singular forms a, an and the are intended to include the plural forms as well, unless the context clearly indicates otherwise.

The descriptions of the various embodiments of the present invention have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

The corresponding structures, materials, acts, and equivalents of all means or steps plus function elements in the claims below are intended to include any structure, material, or act for performing the function in combination with other claimed elements, as specifically claimed. The description of the present invention has been presented for purposes of illustration and description, but is not intended to be exhaustive or limited to the invention in the form disclosed. Many modifications and variations will be apparent to those of ordinary skills in the art without departing from the scope and spirit of the invention. The embodiments are chosen and described in order to best explain the principles of the invention and the practical application, and to enable others of ordinary skills in the art to understand the invention for various embodiments with various modifications, as are suited to the particular use contemplated.

What is claimed is:

1. A semiconductor device circuit for biasing gates of a qubit device comprising:
 a multiplexed array of capacitor cells,
  wherein each of the capacitor cells comprises a transistor-controlled capacitor;
  wherein each of the transistor-controlled capacitors is connected between a drain of a respective transistor and ground;
  wherein each source of each of the respective transistors of each of the capacitor cells is connected to a common control point;
  wherein each gate of each of the respective transistors of each of the capacitor cells are individually voltage controllable;
 a resistor in parallel to the transistor-controlled capacitors of the capacitor cells;
 a charging unit connected to the common control point; and
 a discharging unit connected to the common control point, wherein the charging unit and the discharging unit are alternatively activatable.

2. The semiconductor device circuit according to claim 1, wherein the charging unit further comprises:
 a transistor including a drain connected to the common control point, and further including a source is connected to a supply voltage and a gate connectable to a first control voltage for an activation of the charging unit.

3. The semiconductor device circuit according to claim 1, wherein the discharging unit further comprises:
 a transistor including a drain, the transistor being connected to the common control point, and further including a source connected via a resistor to ground and a gate connectable to a second control voltage for activation of the discharging unit.

4. The semiconductor device circuit according to claim 1, wherein the discharging unit further comprises:
 a transistor including a drain connected to the common control point, and further including a source connected via a current measurement unit to ground, and a gate connectable to a third control voltage for activation of the discharging unit.

5. The semiconductor device circuit according to claim 1, wherein a voltage level at the drain of each of the respective transistors of each of the capacitor cells are kept quasi-constant by a time-based activation of the gate of each of the respective transistors of each of the capacitor cells.

6. The semiconductor device circuit according to claim 1, wherein the semiconductor device circuit is adapted to be operable in a 3K environment.

7. The semiconductor device circuit according to claim 1, wherein a signal level at the drain of the transistors of the capacitor cells represents a bias voltage level for a control gate of a qubit device.

8. The semiconductor device circuit according to claim 1, wherein a discharging time of the capacitors of the capacitor cells is at least 1000 times larger than a charge time.

9. The semiconductor device circuit according to claim 1, wherein each transistor in the semiconductor device circuit is of type n-enhancement.

10. A method for operating a semiconductor device circuit for biasing gates of a qubit device, the method comprising:
 providing a semiconductor device circuit comprising;
  a multiplexed array of capacitor cells, wherein each of the capacitor cells comprises a transistor-controlled capacitor, wherein each of the capacitor is connected between a drain of a transistor and ground, wherein each source of the transistors of each of the capacitor cells is connected to a common control point, and wherein each gate of the transistors of the capacitor cells are individually voltage controllable;
  a charging unit connected to the common control point; and
  a discharging unit connected to the common control point, wherein the charging unit and the discharging unit are alternatively activatable;
 activating the discharging unit by connecting a gate of a transistor of the discharging unit to a second control voltage, wherein a source of the transistor of the discharging unit is connected to a supply voltage, and a drain of the transistor of the discharging unit is connected to the common control point;
 deactivating the charging unit by connecting a gate of a transistor of the charging unit to ground, wherein a source of the transistor of the charging unit is connected via a discharging unit resistor to a ground, and a drain of the transistor of the charging unit is connected to the common control point; and activating selectively and time-based one of the capacitor cells of the multiplexed array of capacitor cells.

11. The method according to claim 10, further comprising:

activating the charging unit by connecting a gate of a transistor of the charging unit to a first control voltage, wherein a source of the transistor of the charging unit is connected to a supply voltage, and the drain of the transistor of the charging unit is connected to the common control point; and deactivating the discharging unit by connecting a gate of the transistor of the discharging unit to ground, wherein a source of the transistor of the discharging unit is connected to a supply voltage, and a drain of the transistor of the charging unit is connected to the common control point.

12. The method according to claim 11, further comprising:

activating periodically one of the capacitor cells of the multiplexed array of capacitor cells, by applying a recharge voltage to the gate of the transistor of the respective capacitor cells thereby achieving a quasi-constant voltage level at the drain of the transistor of the respective capacitor cells.

13. The method according to claim 12, further comprising:

activating periodically another one of the capacitor cells of the multiplexed array of capacitor cells other than the one of the capacitor cells, thereby achieving a quasi-constant voltage level at the drain of the transistor of the another capacitor cell.

14. The method according to claim 12, further comprising:

controlling a frequency of an activation of the one of the capacitor cells of the multiplexed array of capacitor cells while leaving a duration of the activation constant to maintain the quasi-constant voltage level at the drain of another one of the capacitor cells of the multiplexed array of capacitor cells.

15. The method according to claim 10, further comprising:

measuring a voltage over the discharging unit resistor.

16. The method according to claim 10, further comprising:

connecting an output-side resistor in parallel to a capacitor of a capacitor cell; and activating periodically the respective capacitor cells of the array of capacitor cells, thereby implying a periodic current through the output-side resistor.

* * * * *